US008453506B2

(12) United States Patent
Lu

(10) Patent No.: US 8,453,506 B2
(45) Date of Patent: Jun. 4, 2013

(54) SPRING MOUNTING ELEMENT FOR AN ACCELEROMETER

(75) Inventor: Dan Tho Lu, Minden, NV (US)

(73) Assignee: General Electric Company, Schenectady, NY (US)

( * ) Notice: Subject to any disclaimer, the term of this patent is extended or adjusted under 35 U.S.C. 154(b) by 282 days.

(21) Appl. No.: 12/955,157

(22) Filed: Nov. 29, 2010

(65) Prior Publication Data

US 2012/0132001 A1    May 31, 2012

(51) Int. Cl.
*G01P 15/125* (2006.01)
(52) U.S. Cl.
USPC .................................... 73/514.38; 73/514.32
(58) Field of Classification Search
USPC .............. 73/514.32, 514.36, 514.38, 514.18, 73/514.23, 514.24, 510, 493
See application file for complete search history.

(56) References Cited

U.S. PATENT DOCUMENTS

| | | | |
|---|---|---|---|
| 3,127,481 A | | 3/1964 | Herve |
| 3,680,392 A | * | 8/1972 | Hoffman et al. ........... 73/514.05 |
| 3,706,217 A | * | 12/1972 | Slater et al. ..................... 73/497 |
| 3,709,042 A | | 1/1973 | Lee et al. |
| 4,819,486 A | * | 4/1989 | Kunkel et al. ............... 73/382 R |
| 5,292,569 A | * | 3/1994 | Barry et al. ................... 428/66.6 |
| 5,545,461 A | | 8/1996 | Takeuchi et al. |
| 5,627,316 A | | 5/1997 | De Winter et al. |
| 5,710,376 A | | 1/1998 | Weber, Jr. |
| 5,798,460 A | * | 8/1998 | Nakagawa et al. ............. 73/654 |
| 5,856,620 A | * | 1/1999 | Okada ........................ 73/514.32 |
| 6,045,642 A | | 4/2000 | Takeuchi et al. |
| 6,182,509 B1 | | 2/2001 | Leung |
| 6,199,430 B1 | * | 3/2001 | Kano et al. ................. 73/514.32 |
| 6,263,733 B1 | | 7/2001 | Reimer et al. |
| 7,178,401 B2 | | 2/2007 | Byrd |
| 7,179,674 B2 | | 2/2007 | McAlexander, III |
| 7,194,905 B2 | * | 3/2007 | Yamamoto et al. ........ 73/514.32 |
| 8,113,053 B2 | * | 2/2012 | Lu ............................. 73/514.32 |
| 2007/0209437 A1 | | 9/2007 | Xue et al. |
| 2008/0125701 A1 | | 5/2008 | Moberg et al. |
| 2010/0077861 A1 | | 4/2010 | Lu |

* cited by examiner

*Primary Examiner* — Helen Kwok
(74) *Attorney, Agent, or Firm* — Global Patent Operation; Mark A. Conklin

(57) ABSTRACT

A spring mounting element is provided having an inner ring with an inner radial circumference and an outer radial circumference, and an outer ring having an inner radial circumference and an outer radial circumference. A plurality of supporting elements are attached to and symmetrically disposed around the outer radial circumference of the inner ring, and attached to the inner radial circumference of the outer ring. The plurality of supporting elements allow the inner ring to move in three dimensions.

20 Claims, 9 Drawing Sheets

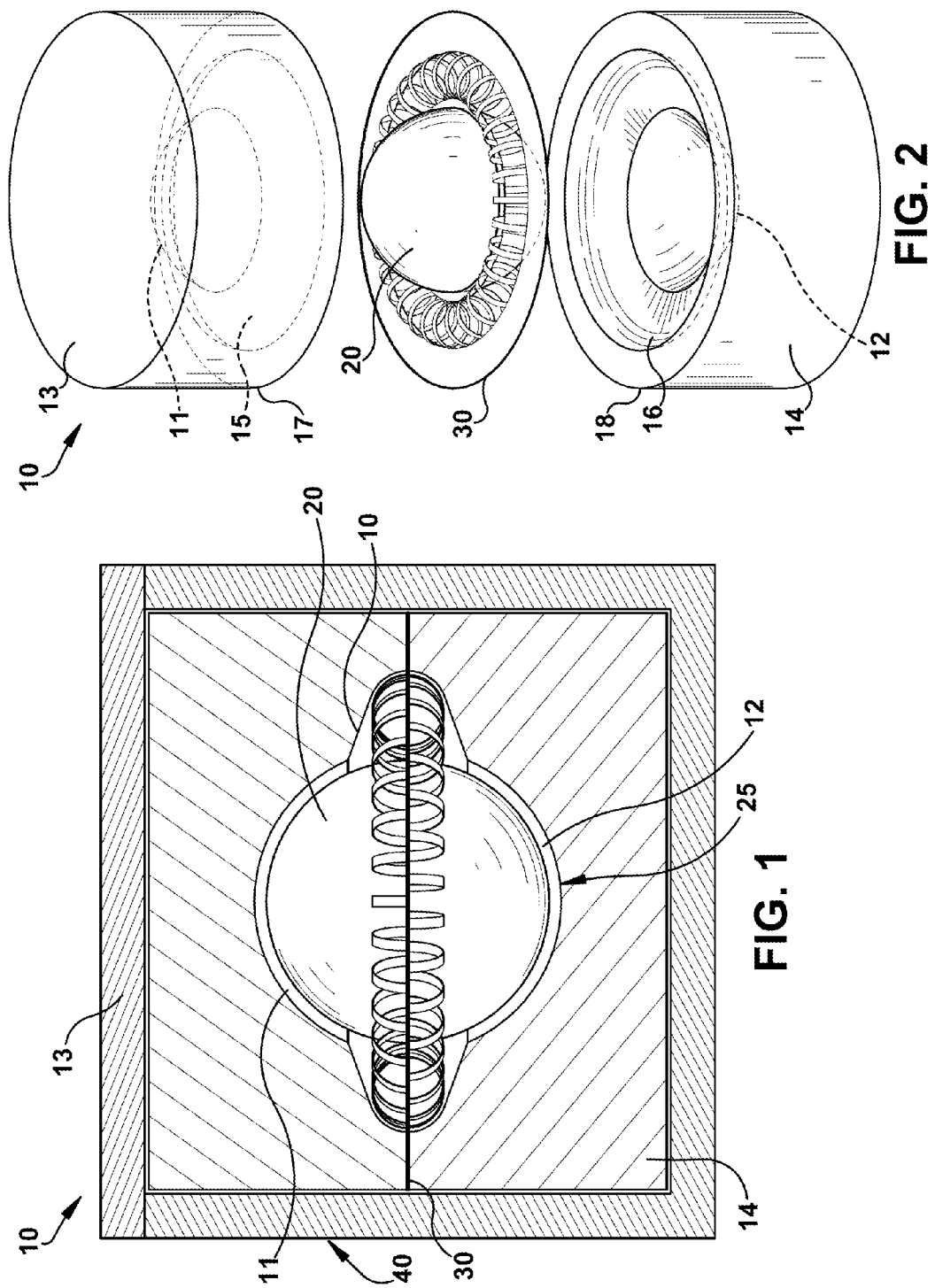

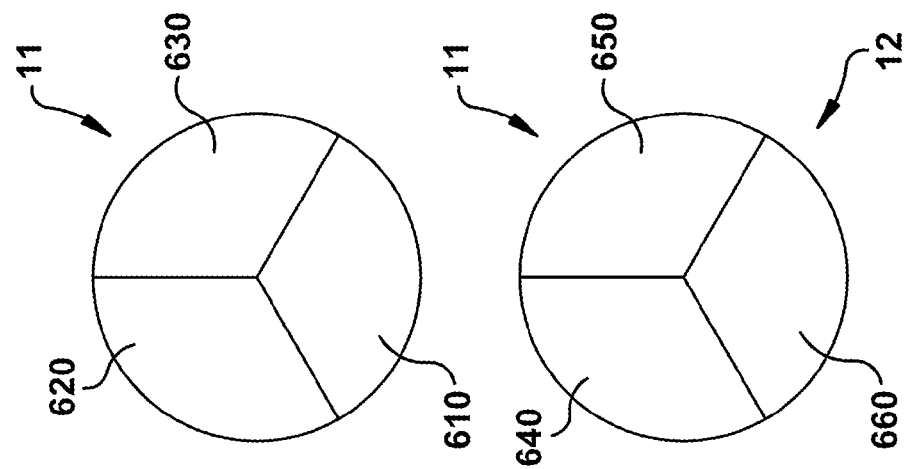
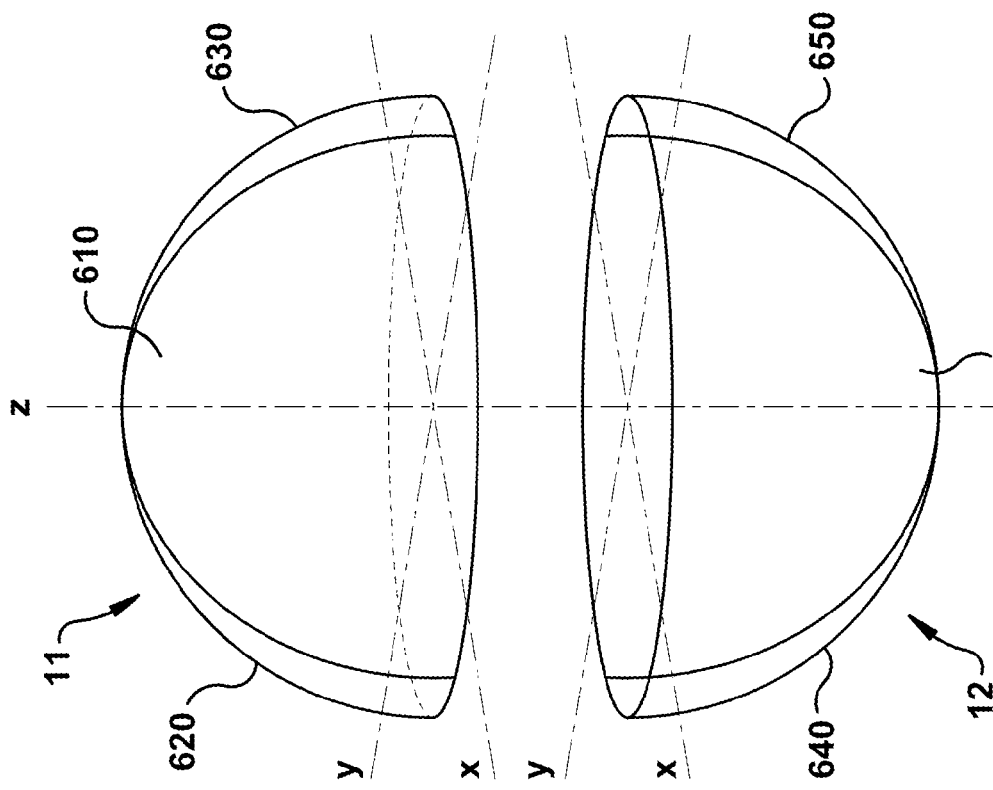

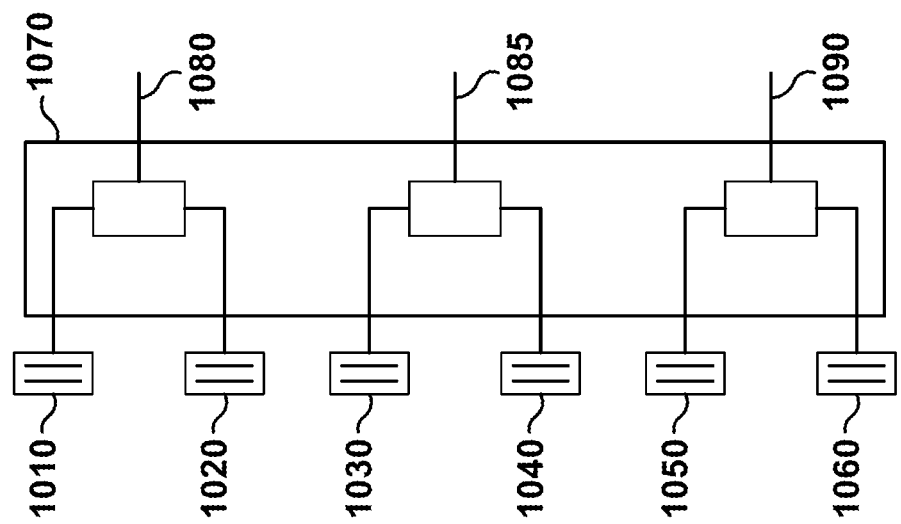
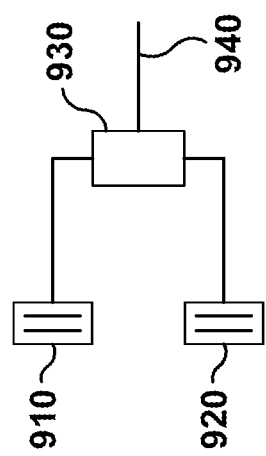

SPRING MOUNTING ELEMENT FOR AN ACCELEROMETER

BACKGROUND OF THE INVENTION

The present invention relates to accelerometers and spring mounting elements, and, more specifically, to capacitive accelerometers and springs tolerant of extreme conditions, particularly of high temperatures.

Accelerometers are used to measure acceleration and come in several forms. Capacitive accelerometers have a conductive mass, called a seismic or inertial proof mass, suspended on a spring between two conductive plates. A gas, such as air or a non-reactive gas, occupies the space between the mass and the plates. The arrangement forms two capacitors, one between each plate and the proof mass with the gas acting as a dielectric. When the device experiences an acceleration, the proof mass moves closer to one plate or the other, reducing the gap between the proof mass and one plate while increasing the distance between the proof mass and the other plate, changing the capacitance in the capacitors. By comparing the capacitances, the direction and magnitude of the acceleration can be determined. However, most capacitive accelerometers can only measure acceleration along one axis because of their structure. To measure acceleration along more than one axis, one accelerometer must be provided for each axis of interest, which can become complicated. In addition, because of their materials and construction, capacitive accelerometers tend to be susceptible to failure at high temperatures, such as might be experienced in a gas turbine.

BRIEF DESCRIPTION OF THE INVENTION

In one aspect of the present invention a spring mounting element is provided having an inner ring with an inner radial circumference and an outer radial circumference, and an outer ring having an inner radial circumference and an outer radial circumference. A plurality of supporting elements are attached to and symmetrically disposed around the outer radial circumference of the inner ring, and attached to the inner radial circumference of the outer ring. The plurality of supporting elements allow the inner ring to move in three dimensions.

In another aspect of the present invention an accelerometer is provided. The accelerometer has concave first and second surfaces of substantially identical profile and surface area, and the first surface faces the second surface. At least one electrically conductive region is on a respective portion of each of the first and second surfaces. A spring mounting element includes an inner ring having an inner radial circumference and an outer radial circumference, and an outer ring having an inner radial circumference and an outer radial circumference. A plurality of supporting elements are attached to and symmetrically disposed around the outer radial circumference of the inner ring, and the plurality of supporting elements are attached to the inner radial circumference of the outer ring. A proof mass is attached to the spring mounting element and supported between the first and second surfaces for movement therebetween, and at least a portion of the proof mass is electrically conductive. The spring mounting element allows the proof mass to move in three dimensions.

BRIEF DESCRIPTION OF THE DRAWINGS

FIG. 1 is a perspective illustration of an accelerometer according to an aspect of the present invention;

FIG. 2 is a perspective exploded illustration of an accelerometer according to an aspect of the present invention;

FIGS. 3-8 are schematic illustrations of hemispherical surfaces of accelerometers according to aspects of the present invention;

FIG. 9 is a schematic illustration of conditioning circuitry according to an aspect of the present invention;

FIG. 10 is a schematic illustration of conditioning circuitry according to an aspect of the present invention;

DETAILED DESCRIPTION OF THE INVENTION

Figure 4:
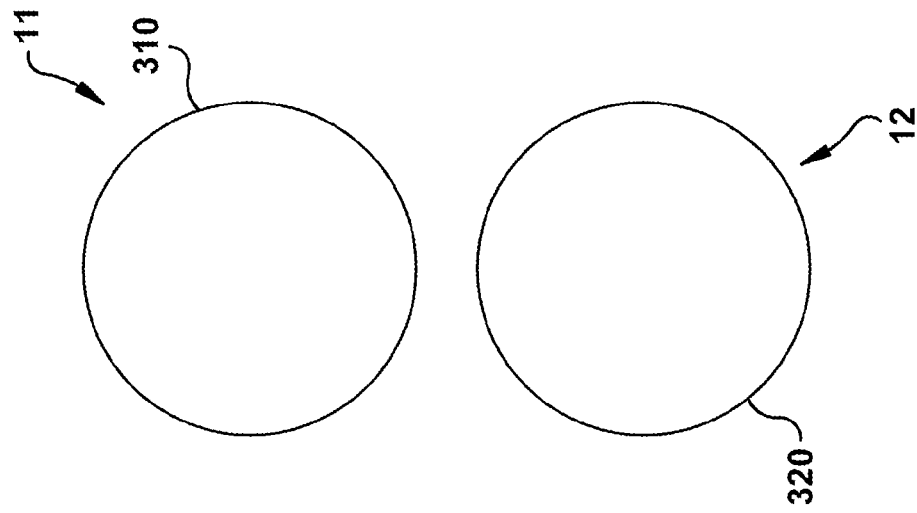

With reference to the accompanying FIGS., examples of an accelerometer and spring mounting element according to aspects of the invention are disclosed. For purposes of explanation, numerous specific details are shown in the drawings and set forth in the detailed description that follows in order to provide a thorough understanding of aspects of the invention. The details shown and described are examples and are not limiting on the scope of the invention. It will be apparent, however, that aspects of the invention may be practiced without these specific details. In other instances, well-known structures and devices are schematically shown in order to simplify the drawings.

As seen in FIGS. 1 and 2, an accelerometer 10 according to an aspect includes hemispherical concave first and second surfaces 11, 12 formed in first and second plates 13, 14, the first surface 11 facing the second surface 12. While hemispherical surfaces are shown in the example aspects, other configurations could be used, such as, but not limited to, polygonal surfaces, elliptical surfaces, hyperbolic surfaces, and parabolic surfaces, and any other suitable surface so long as the first and second surfaces have substantially identical profiles and surface area. The first and second surfaces 11, 12 are of substantially identical radii of curvature, surface area, and other dimensions such as, but not limited to, depth, and perimeter at the surfaces of the plates 13, 14. Each of the first and second surfaces 11, 12 has at least one portion that is or carries an electrically conductive region, each electrically conductive region being centered about the surficial center of its respective portion. A seismic or inertial proof mass 20 is suspended between the first and second surfaces 11, 12 by a substantially omni-directional spring-like mounting element 30, such as a flexure plate and/or spring, so that the proof mass 20 can engage in motion in multiple dimensions. While a spherical proof mass 20 is shown in the example aspects, other configurations or profiles could be used within the scope of the invention, such as, but not limited to, polygonal, elliptical, hyperbolic, and parabolic profiles. The spring mounting element 30 allows motion of the proof mass in one, two or three dimensions. As is known, the motion of an object in multidimensional spaces can be described by components of its motion along axes. For example, two dimensional motion can be described by components of motion along two mutually perpendicular axes. Similarly, for example, three dimensional motion can be described by components of motion along three mutually perpendicular axes.

At least a portion of the proof mass 20 is electrically conductive. The space 25 between the proof mass 20 and the first and second surfaces 11, 12 is filled with a gas that acts as a dielectric. In one aspect, the gas is non-reactive, or has low reactivity, at high temperatures, such as helium, though other gases can be used as long as they have suitably low reactivity for the purpose disclosed herein. To allow for deflection of the spring, each of the first and second plates include a cut-out, such as a frustroconical cut-out 15, 16 around the opening of the respective hemispherical surfaces 11, 12. The remaining portions of the engaging surfaces 17, 18 of the first and second plates 13, 14 engage and retain the flexure plate. In some aspects of the present invention, the first and second plates 13, 14, the spring mounting element 30, and the proof mass 20 are made of a non-conductive material. The electrically conductive portions of the first and second plates 11, 12 and proof mass 20 are formed by applying metal or conductive coatings to the first and second surfaces 11, 12 of the plates 13, 14 and the proof mass 20. Such coatings will have a thickness, but so long as the thickness is substantially uniform, the effect of the thickness is balanced and/or negligible. In high temperature applications, the metal coatings are made from a metal with a high melting point so that the coatings are unperturbed at the high temperatures to which the accelerometer and spring are exposed.

The material from which first and second plates 13, 14 in high temperature applications are made in may be a ceramic material that tolerates high temperatures. Other materials can be employed for other applications as appropriate within the scope of the invention. While the plates 13, 14 are shown in FIGS. 1 and 2 as being cylindrical, other shapes can be employed in aspects. Similarly, while the cut-out portions 15, 16 that allow motion of the spring mounting element 30 are shown as frustroconical, other shapes can be applied as long as they accommodate the appropriate motion of the spring mounting element 30. The material from which the seismic or inertial proof mass 20 is made may also be a ceramic material, particularly in high temperature applications, although other suitable materials can be used.

As shown in FIG. 1, the spring mounting element 30 is attached to the proof mass 20 so that the inner periphery of the spring mounting element 30 moves with the proof mass 20. At its outer periphery, the spring mounting element 30 is held by the ends 17, 18 of the upper plate 13 and the lower plate 14. An outer housing 40 can be included to hold the assembly together and to provide a sealed chamber to hold the dielectric gas. The outer housing can be stainless steel, ceramic, or another suitable heat-tolerant material for high temperature application aspects. The outer housing 40 shown in FIG. 1 is only an example, and other shapes, sizes, types, and assemblies of outer housings can be used without departing from the scope of the various aspects of the present invention.

Figure 3:
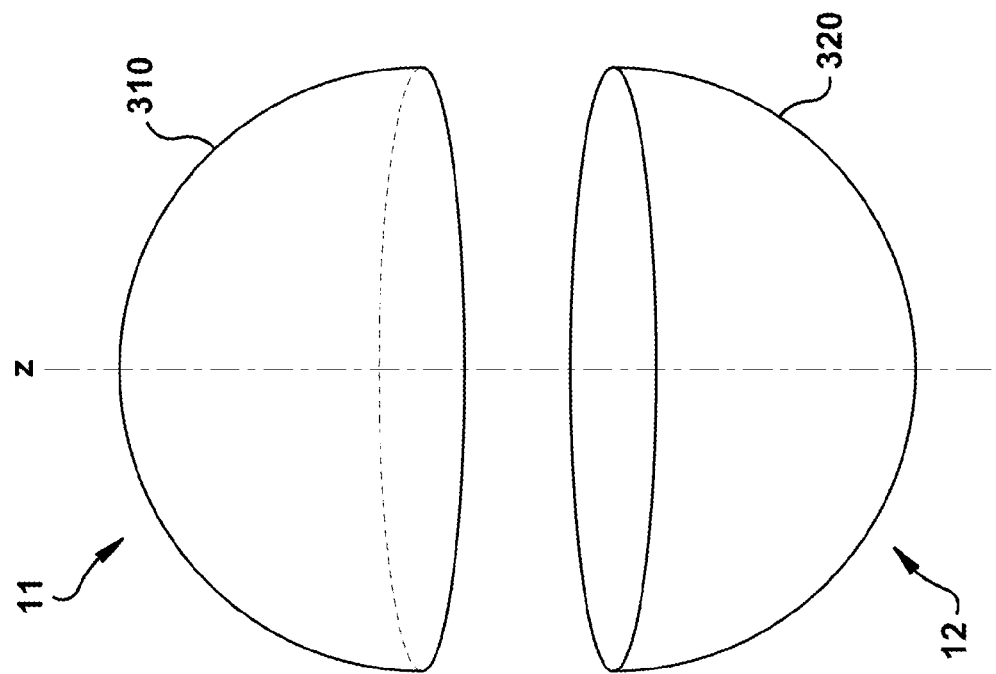

As seen in FIGS. 3 and 4, each hemispherical surface 11, 12 has one portion carrying a respective electrically conductive region 310, 320. In the aspect shown in FIGS. 3 and 4, each entire surface 11, 12 is coated with a metal to form the electrically conductive regions 310, 320, but smaller coated areas can be employed to form the electrically conductive regions 310, 320 as long as they are the same size and the centers of the electrically conductive regions 310, 320 coincide with surficial centers of the respective surface to which they are applied. Each electrically conductive region 310, 320 forms a capacitor with the proof mass 20. When a single coated portion 310, 320 is on each surface, the accelerometer 10 can measure a component of acceleration along a single axis by virtue of the change in capacitance induced by deflection of the proof mass 20 when the accelerometer 10 experiences acceleration, or at least a component thereof, along the axis. For example, as seen in FIG. 3, the single axis of measurement, labeled the z-axis, passes through the centers of the hemispheres.

Figure 6:
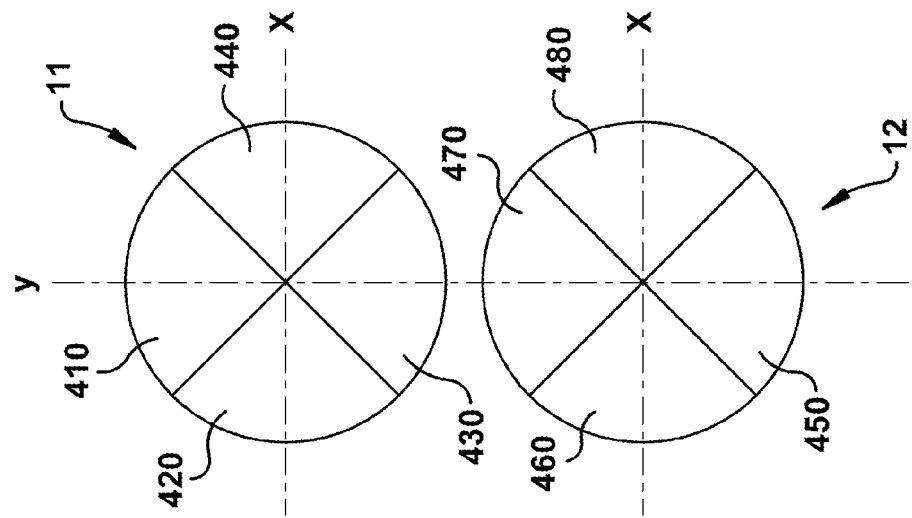
Figure 5:
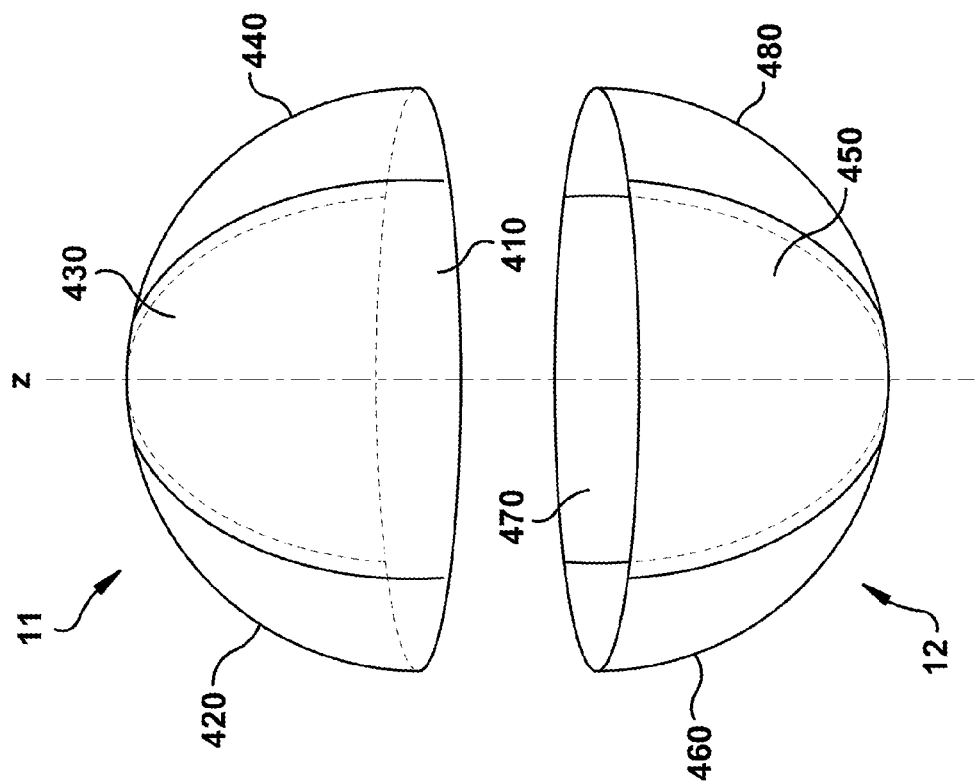

As seen in FIGS. 5 and 6, an aspect employs four portions in each hemispherical surface 11, 12 that are or carry electrically conductive regions 410, 420, 430, 440, 450, 460, 470, and 480. Combinations of the regions are employed to measure acceleration or components thereof in three dimensions. Each of the eight electrically conductive regions 410, 420, 430, 440, 450, 460, 470, and 480 are electrically isolated from adjacent ones of the electrically conductive regions. Electrical isolation is achieved, for example, by leaving portions of the surfaces uncoated to form borders between the regions. Each electrically conductive region effectively forms a capacitor with the spaced-apart proof mass. Opposed pairs of the regions form opposed capacitors that can measure acceleration, or at least components thereof, along axes passing through the respective opposed pairs. In addition, opposed pairs of sets or groups of the regions can be used to measure acceleration, or at least components thereof, along axes passing through the respective opposed pairs of groups of the regions. For example, in aspects, using combinations of the eight electrically conductive regions as seen in FIGS. 5 and 6 allows measurement of acceleration in space by, for example, measuring components of the acceleration along the three mutually perpendicular Cartesian axes. Measurement of the component of acceleration along the y-axis as labeled in FIG. 6 can be achieved by comparing the total capacitance of a first set of regions 410 and 450 to the total capacitance of a second set of regions 430 and 470, along the x-axis as labeled in FIG. 6 by comparing the total capacitance of a third set of regions 420 and 460 to the total capacitance of a fourth set of regions 440 and 480, and along the z-axis by comparing the total capacitance of a fifth set of regions 410-440 to the total capacitance of a sixth set of regions 450-480, for example. Other sets and orientations can be used to provide similar results.

In one aspect, as with the single electrically conductive region per hemispherical surface discussed above, the electrically conductive regions can be smaller than the respective portions of the surface to which they are applied as long as the center of each electrically conductive region coincides with the surficial center of the respective portion to which it is applied. In addition, the electrically conductive regions should all be substantially the same size.

A more general principle is that opposed pairs of capacitors formed by opposed electrically conductive regions or opposed symmetric sets or groups thereof and the proof mass can measure accelerations along an axis passing through the centers of the opposed electrical portions and the center of the proof mass in its initial position. Thus, the invention is not limited to one or four electrically conductive regions per hemispherical surface as described above, but can have two, three, five, or more electrically conductive regions as appropriate for a given situation.

As seen in FIGS. 7 and 8, an alternate three axis accelerometer according to an aspect employs six electrically conductive regions 610, 620, 630, 640, 650, 660 electrically isolated from each other, three in each hemispherical surface 11, 12. Again, the electrical isolation can be achieved by leaving portions of the surfaces uncoated to form borders between the regions. The hemispheres 11, 12 have substantially identical arrangements of their electrically conductive regions, but one is rotated 180 degrees relative to the other in the x-y plane to place the regions 610, 620, 630 of the upper hemisphere 11 opposite the proof mass 20 from corresponding regions 640, 650, 660 of the lower hemisphere 12. Each region effectively forms a respective capacitor with the spaced-apart proof mass 20, and opposed pairs 610/660, 620/650, and 630/640 of the regions can measure acceleration, or at least components thereof, along axes passing through the centers of the regions of respective opposed pairs. Using three opposed pairs as seen in FIGS. 7 and 8 allows measurement along three axes so that components of acceleration along the three Cartesian mutually perpendicular axes can be measured with proper orientation of the accelerometer 10 and/or appropriate correction factors applied in conditioning circuitry and/or processing hardware and/or software.

As with the aspects discussed above employing one and four electrically conductive regions per hemispherical surface, the electrically conductive regions of aspects can be smaller than the respective portion of the surface to which they are applied as long as the center of each electrically conductive region coincides with the surficial center of the respective portion to which it is applied. In addition, the electrically conductive regions should all be the same size in aspects.

In aspects, as discussed above, the proof mass and opposed pairs of capacitors or opposed symmetric sets or groups of capacitors are connected to conditioning circuitry. The conditioning circuitry monitors capacitance between each capacitor or group of capacitors and the proof mass and provides a respective signal, such as a voltage, indicative of a differential capacitance between opposed pairs or opposed symmetric sets or groups of capacitors. Each signal is an indication of a magnitude and/or direction of acceleration experienced by the accelerometer as a function of a degree of change of the monitored capacitances from an initial value.

Thus, as seen in FIG. 9, a single axis measurement of acceleration can be achieved by connecting a first capacitance 910 comprising a first capacitor or set of capacitors and a second capacitance 920 comprising a second capacitor or set of capacitors 920 to conditioning circuitry 930. The conditioning circuitry 930 provides a signal 940 indicative of a differential capacitance between the first and second capacitances 910, 920. The signal 940 is indicative of a magnitude and/or direction of acceleration experienced by the accelerometer as a function of a degree of change of the first and second capacitances 910, 920 from initial values.

Similarly, as seen in FIG. 10, a three-axis measurement of acceleration can be achieved by connecting first, second, third, fourth, fifth, and sixth capacitances 1010-1060 to conditioning circuitry 1070. As above, each capacitance can be a single capacitor or a set of capacitors. The conditioning circuitry 1070 provides a first signal 1080 indicative of the differential capacitance between the first and second capacitances 1010, 1020 and a second signal 1085 indicative of a differential capacitance between the third and fourth capacitances 1030, 1040, and a third signal 1090 indicative of a differential capacitance between the fifth and sixth capacitances 1050, 1060.

Figure 11:
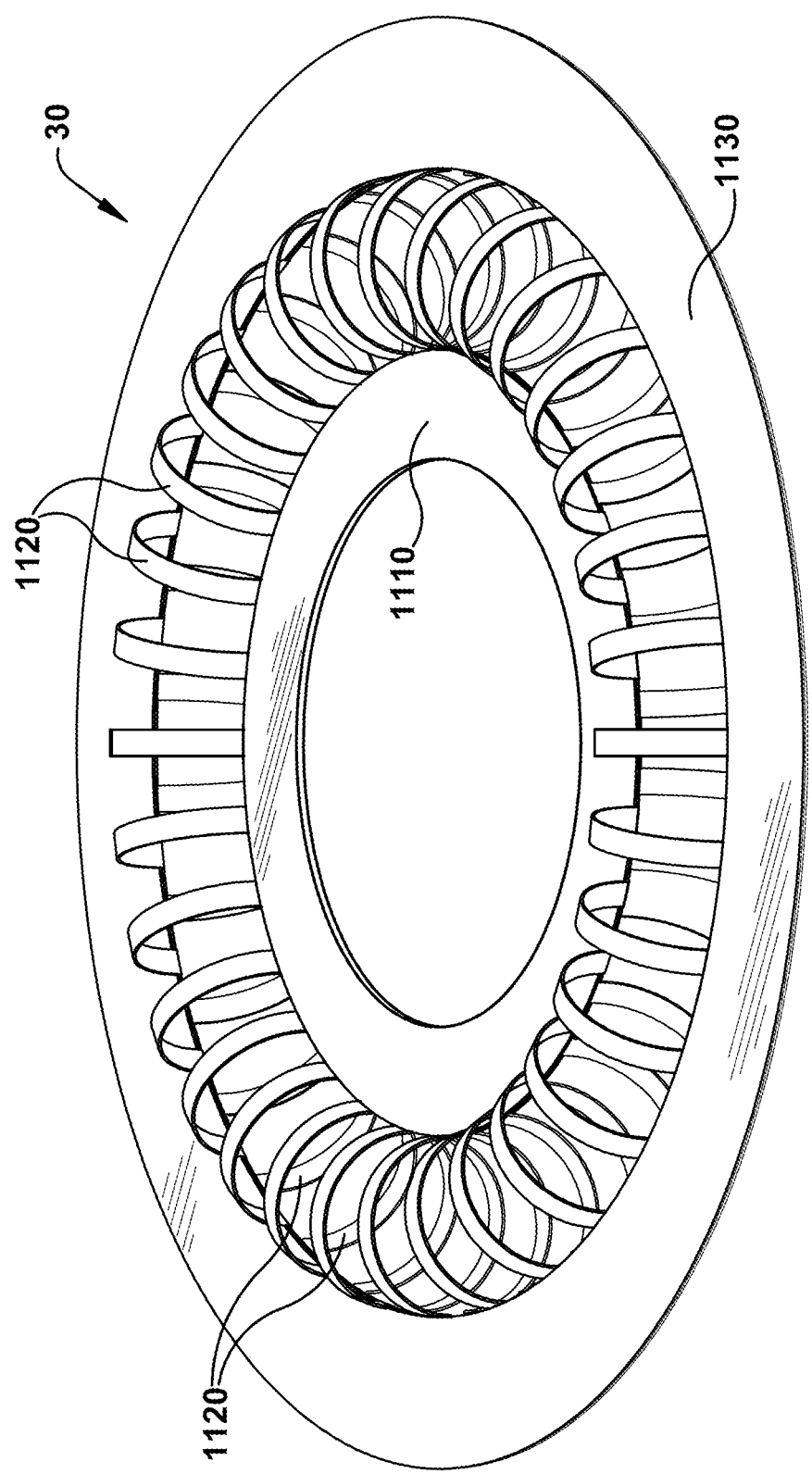
FIG. 11 is a perspective illustration of a spring mounting element according to an aspect of the present invention.

FIG. 11 illustrates a perspective view of a spring mounting element 30 that can be used to retain a proof mass 20, according to an aspect of the present invention. The spring mounting element is comprised of an inner ring 1110, a plurality of supporting elements 1120 and an outer ring 1130. The inner ring 1110 is attached to the proof mass 20. The supporting elements 1120 may be comprised of arcuate strips of material that are symmetrically disposed around and attached to the periphery or outer circumference of the inner ring 1110. The supporting elements are also attached to the inner circumference of the outer ring 1130.

The outer ring may be secured by the ends 17, 18 of the upper plate 13 and the lower plate 14 (see FIG. 2). The proof mass is secured to the inner ring 1110, and is allowed to move omni-directionally in three dimensions by the supporting elements 1120. The number and shape of the supporting elements may be varied in design as desired in the specific application. The inner and outer rings 1110, 1130 and the supporting elements 1120 can be made out of any suitable material, including but not limited to metal, metal alloys, plastic. For example, in high temperature applications, the material may be chosen from one or combinations of: aluminum, chromium, cobalt, iron, magnesium, molybdenum, nickel, steel, titanium, tungsten, and vanadium.

Figure 12:
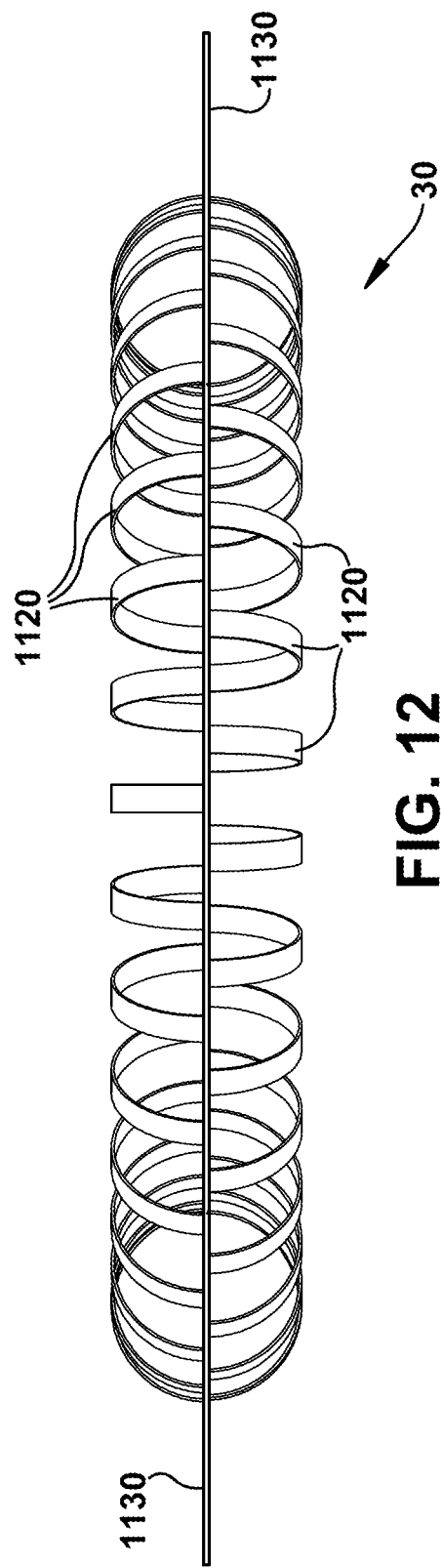
FIG. 12 is a side view illustration of a spring mounting element according to an aspect of the present invention.

The supporting elements 1120 can be comprised of semi-circular or arcuate strips of material that cooperatively function as an omni-directional spring. As shown in FIG. 12, the array of supporting elements can be arranged in a staggered manner. As one example only, going clockwise around the plurality of supporting elements 1120, the first supporting element can be arranged to project axially upward (+Z-axis), the next supporting element in a clockwise direction can be arranged to project axially downward (−Z-axis), and this pattern can be repeated until all supporting elements are placed between the inner and outer rings. In other words, the supporting elements can be arranged in an alternating and staggered arrangement, where adjacent supporting elements are located on opposite sides of the inner ring and outer ring.

The plurality of supporting elements 1120 are substantially radially oriented and support the proof mass 20 effectively and predictably during motion in three dimensions. The arrangement and shape of the supporting elements 1120 have reduced sensitivity to temperature effects as the expansion or contraction of one set of supporting elements (e.g., the +Z-axis elements) will be counter-acted by the opposing set of supporting elements (e.g., the −Z-axis elements). In addition, elements on one side (e.g., the left side) will counteract expansion or contraction of the elements on the other side (e.g., the right side). As can be seen in FIGS. 11 and 12, the spring mounting element 30 can be symmetrical in all three dimensions, and the symmetrical nature of the plurality of supporting elements 1120 will enhance the linearity of the spring mounting element 30.

Figure 13:
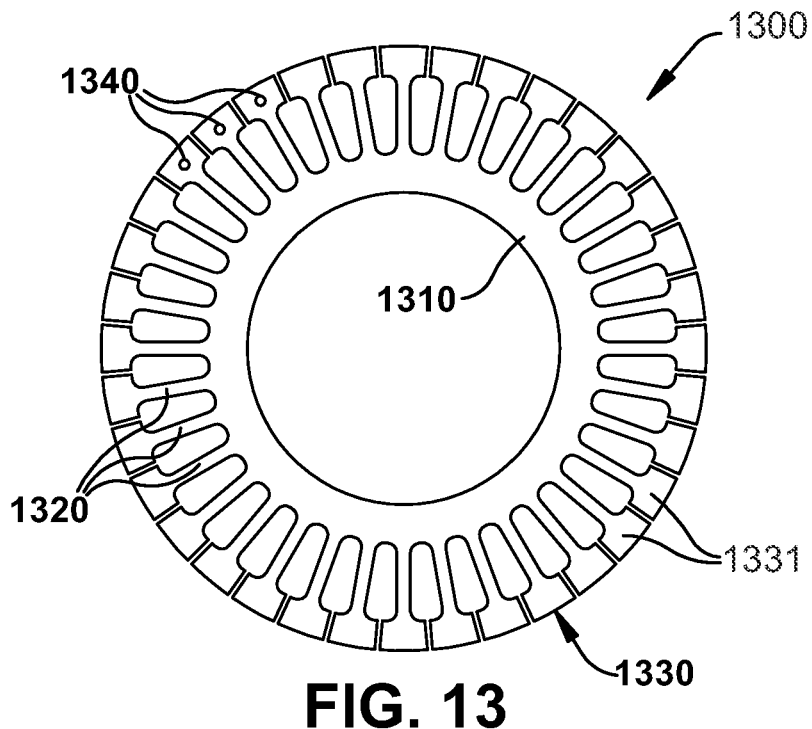
FIG. 13 is a top view illustration of a spring mounting element according to an aspect of the present invention.

FIG. 13 illustrates a top view of a spring mounting element 1300 that can be used to support the proof mass 20, according to another aspect of the present invention. FIG. 13 shows the spring mounting element 1300 during manufacture and before the supporting elements 1320 have been formed into a semi-circular shape. The spring mounting element 1300 can be formed from a stamped or machined blank, and includes an inner ring 1310, a plurality of supporting elements 1320 and an outer ring 1330. A plurality of segmented tabs 1331 are formed in the outer ring and a gap or space is formed between adjacent tabs.

Figure 14:
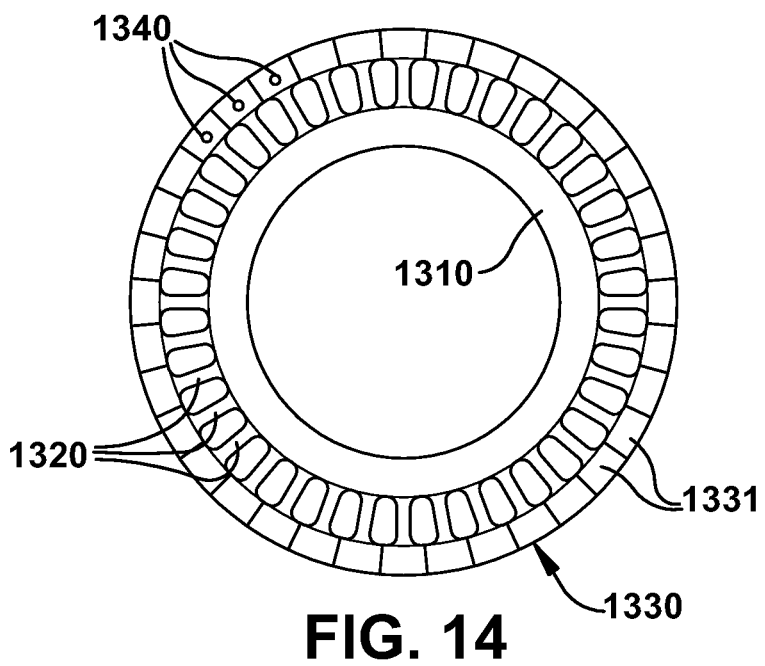
FIG. 14 is a top view illustration of a spring mounting element according to an aspect of the present invention.

FIG. 14 illustrates a top view of the spring mounting element 1300 after the support elements 1320 have been formed into a semi-circular shape. It can be seen that after the support elements 1320 are "curved" or bent into their desired shape, the outer ring element, including the tabs 1331, moves radially inward towards the inner ring 1310. Each adjacent supporting element 1320 can be configured in a similar manner to those illustrated in FIGS. 11 and 12, in that on supporting element projects in a +Z-axis direction while adjacent supporting elements project in a −Z-axis direction. The tabs 1331 can be joined to each other intimately or through the outer supporting ring (or rings) by any suitable method, including but not limited to welding and adhesive application, or the tabs can be left unjoined as may be desired in the specific application.

The outer ring 1330 may be secured by the ends 17, 18 of the upper plate 13 and the lower plate 14 (see FIG. 2). In addition, the ends 17, 18 may include a plurality of circumferentially disposed posts and holes (not shown). For example, the posts could be placed on end 18 and extend upward, while the opposing holes are formed in end 17 and are aligned with the location of the posts. One or more tabs 1331 could have optional holes 1340 that are also aligned with the posts and holes in the ends 17, 18. The outer ring 1330 could be placed over the posts and these posts would aid in preventing and undesired movement of the spring mounting element. Only a few holes 1340 are shown, but it is to be understood that the holes 1340 could be present in one or more of the circumferential tabs 1331.

The outer ring 1330 (and tabs 1331) could also be joined to a secondary outer ring (not shown). The secondary outer ring would be placed above and/or below the tabs 1331 so that the secondary outer ring covers at least one side of the outer ring 1330, and then the two elements could be joined in any suitable manner (e.g., welding, adhesive, etc.). The two layers (formed by the secondary outer ring and the outer ring 1330/ tabs 1331) could then be sandwiched between the ends 17 and 18.

The proof mass 20 can be configured as a solid unitary element or may be a multi-piece (e.g., two or more) element. As one non-limiting example only, the proof mass may be formed by two halves, and the two halves may include one or more members used to engage corresponding members on the spring supporting element.

Figure 15:
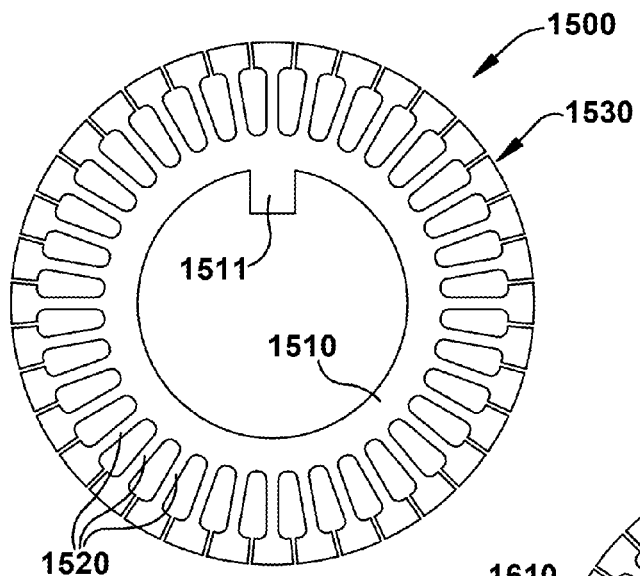
FIG. 15 is a top view illustration of a spring mounting element according to an aspect of the present invention.

FIG. 15 illustrates a top view of a spring mounting element 1500 having inner ring 1510, supporting elements 1520 and outer ring 1530. The inner ring 1510 includes a key element 1511. The key element can be configured to project radially inward (as shown), radially outward, or in any other suitable direction as desired in the specific application. The key element 1511 is designed to engage a corresponding recess formed in the proof mass 20.

Figure 16:
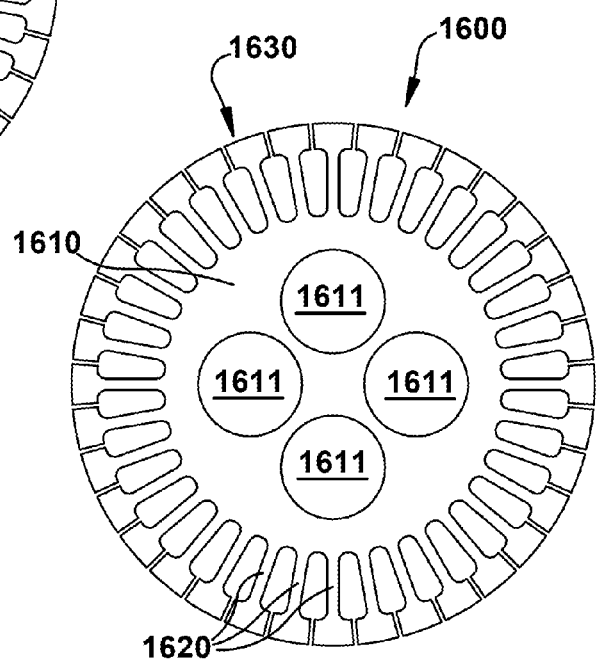
FIG. 16 is a top view illustration of a spring mounting element according to an aspect of the present invention.

FIG. 16 illustrates a top view of a spring mounting element 1600 having inner ring 1610, supporting elements 1620 and outer ring 1630. The inner ring 1610 includes one or more apertures 1611. The apertures 1611 can be configured in any suitable shape and number as desired in the specific application. The apertures 1611 are designed to engage corresponding projections in the proof mass 20.

Figure 17:
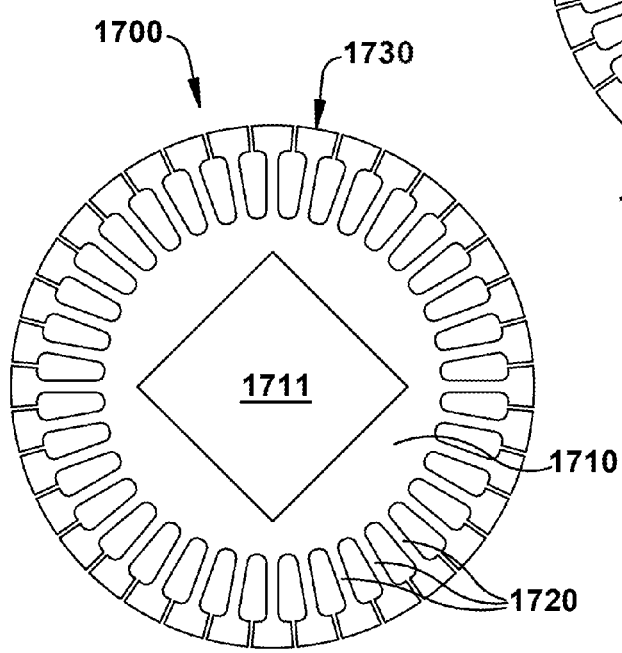
FIG. 17 is a top view illustration of a spring mounting element according to an aspect of the present invention.

FIG. 17 illustrates a top view of a spring mounting element 1700 having inner ring 1710, supporting elements 1720 and outer ring 1730. The inner ring 1710 includes a non-circular aperture 1711. The apertures 1711 can be configured in any suitable shape (e.g., rectangular, polygonal, oval) as desired in the specific application. The aperture 1711 is designed to engage one or more corresponding projections in the proof mass 20.

By applying aspects as disclosed herein, a compact and robust accelerometer is provided. In particular, a multi-axis accelerometer that can withstand extreme temperatures, such as are present in a gas turbine, is provided. In addition, the spring mounting element can be used wherever an object or assembly requires precision spring support in three dimensions.

While the instant disclosure has been described with reference to one or more exemplary aspects, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular aspect(s) disclosed as the best mode contemplated for carrying out this invention, but that the invention will include all aspects falling within the scope of the appended claims.

The invention claimed is:

1. A spring mounting element comprising:
   an inner ring having an inner radial circumference and an outer radial circumference;
   an outer ring having an inner radial circumference and an outer radial circumference;
   a plurality of supporting elements attached to and symmetrically disposed around the outer radial circumference of the inner ring, and attached to the inner radial circumference of the outer ring, and wherein the plurality of supporting elements are arranged in an alternating and staggered arrangement, wherein circumferentially adjacent ones of the plurality of supporting elements are located on opposite sides of the inner ring and the outer ring; and
   wherein, the plurality of supporting elements allow the inner ring to move in three dimensions, and wherein the spring mounting element is configured for use in an accelerometer that allows measurement of acceleration in three dimensions.

2. The spring mounting element of claim 1, wherein each of the plurality of supporting elements are comprised of spring-like arcuate members.

3. The spring mounting element of claim 1, wherein each of the plurality of supporting elements comprises one or combinations of:
   aluminum, chromium, cobalt, iron, magnesium, molybdenum, nickel, steel, titanium, tungsten, and vanadium.

4. The spring mounting element of claim 1, wherein the outer ring is comprised of a plurality of segmented tabs.

5. The spring mounting element of claim 4, wherein neighboring tabs of the plurality of segmented tabs are joined to each other.

6. The spring mounting element of claim 1, wherein the inner ring comprises a key that projects radially inward.

7. The spring mounting element of claim 1, wherein the inner ring comprises a plurality of apertures.

8. The spring mounting element of claim 1, wherein the inner ring comprises at least one aperture.

9. An accelerometer comprising:
   concave first and second surfaces of substantially identical profile and surface area, the first surface facing the second surface;
   at least one electrically conductive region on a respective portion of each of the first and second surfaces;
   a spring mounting element comprising:
   an inner ring having an inner radial circumference and an outer radial circumference;
   an outer ring having an inner radial circumference and an outer radial circumference;
   a plurality of supporting elements attached to and symmetrically disposed around the outer radial circumference of the inner ring, and attached to the inner radial circumference of the outer ring, wherein each of the plurality of supporting elements are comprised of spring-like arcuate members;
   a proof mass attached to the spring mounting element and supported between the first and second surfaces for movement therebetween, at least a portion of the proof mass being electrically conductive; and wherein, the spring mounting element allows the proof mass to move in three dimensions, the accelerometer allowing measurement of acceleration in three dimensions.

10. The accelerometer of claim 9, wherein the plurality of supporting elements are arranged in an alternating and staggered arrangement, wherein adjacent ones of the plurality of supporting elements are located on opposite sides of the inner ring and the outer ring.

11. The accelerometer of claim 9, wherein each of the plurality of supporting elements comprises one or combinations of:

aluminum, chromium, cobalt, iron, magnesium, molybdenum, nickel, steel, titanium, tungsten, and vanadium 12. The accelerometer of claim 9 wherein the first and second surfaces are substantially hemispherical of substantially identical radius.

13. The accelerometer of claim 9 wherein the at least one electrically conductive region of each of the first and second surfaces is a plurality of electrically conductive regions electrically isolated from each other and arranged such that an electrically conductive region of the first surface has a corresponding opposed electrically conductive region of the second surface.

14. The accelerometer of claim 13 wherein each plurality of electrically conductive regions comprises three or more electrically conductive regions.

15. The accelerometer of claim 9 wherein the electrically conductive regions of the first and second surfaces comprise metal coatings.

16. The accelerometer of claim 9, wherein the outer ring is comprised of a plurality of segmented tabs, and wherein neighboring tabs of the plurality of segmented tabs are joined to each other.

17. The accelerometer of claim 9, wherein the inner ring comprises a key that projects radially inward.

18. The accelerometer of claim 9, wherein the inner ring comprises at least one aperture.

19. An accelerometer comprising:

concave first and second surfaces of substantially identical profile and surface area, the first surface facing the second surface;

at least one electrically conductive region on a respective portion of each of the first and second surfaces;

a spring mounting element comprising:
  an inner ring having an inner radial circumference and an outer radial circumference;
  an outer ring having an inner radial circumference and an outer radial circumference;
  a plurality of supporting elements attached to and symmetrically disposed around the outer radial circumference of the inner ring, and attached to the inner radial circumference of the outer ring, wherein each of the plurality of supporting elements are comprised of spring-like arcuate members, the plurality of supporting elements arranged in an alternating and staggered arrangement, wherein adjacent ones of the plurality of supporting elements are located on opposite sides of the inner ring and the outer ring;

a spherical proof mass attached to the spring mounting element and supported between the first and second surfaces for movement therebetween, at least a portion of the spherical proof mass being electrically conductive; and wherein, the spring mounting element allows the spherical proof mass to move in three dimensions, so that the accelerometer allows measurement of acceleration in three dimensions.

20. The accelerometer of claim 19 wherein the at least one electrically conductive region of each of the first and second surfaces is a plurality of electrically conductive regions electrically isolated from each other and arranged such that an electrically conductive region of the first surface has a corresponding opposed electrically conductive region of the second surface; and wherein each plurality of electrically conductive regions comprises three or more electrically conductive regions.

\* \* \* \* \*

UNITED STATES PATENT AND TRADEMARK OFFICE
CERTIFICATE OF CORRECTION

PATENT NO. : 8,453,506 B2  
APPLICATION NO. : 12/955157  
DATED : June 4, 2013  
INVENTOR(S) : Lu Page 1 of 1

It is certified that error appears in the above-identified patent and that said Letters Patent is hereby corrected as shown below:

In the Specification

In Column 3, Line 13, delete "frustroconical" and insert -- frustoconical --, therefor.

In Column 3, Line 20, delete "first and second plates 11, 12" and insert -- first and second surfaces 11, 12 --, therefor.

In Column 3, Line 38, delete "frustroconical," and insert -- frustoconical, --, therefor.

Signed and Sealed this  
Third Day of September, 2013

Teresa Stanek Rea  
*Acting Director of the United States Patent and Trademark Office*